Patented Dec. 19, 1944

2,365,345

UNITED STATES PATENT OFFICE 2,365,345

N-SUBSTITUTED AMINONAPHTHOL DYE INTERMEDIATES

James Emory Kirby and David W. Woodward, Wilmington, Del., assignors, by mesne assignments, to E. I. du Pont de Nemours & Company, Wilmington, Del., a corporation of Delaware No Drawing. Application May 27, 1941, Serial No. 395,496

6 Claims. (Cl. 260—507)

This invention pertains to new dye intermediates and more particularly to a new class of N-substituted aminonaphthol dye intermediates. Still more particularly it pertains to N-substituted aminonaphthol dye intermediates wherein the hydroxyl group is in one ring and the other contains a substituted amino group.

This invention has for an object the production of new dye intermediates. A further object is to provide new basic aminonaphthol dye intermediates which are immobile in colloidal binding agents. Another object is to provide N-substituted aminonaphthol dye intermediates which can be used to form azo dyes in photographic color processes. A further object is to provide N-substituted aminonaphthol dye intermediates which will yield good dye images when coupled with aromatic nitroso compounds or the oxidation products of aromatic amino photographic developers or hydrazine developers in processes of color photography. Still other objects are to provide methods of preparing immobile dye intermediates of aforesaid type, capable of being converted to dyes having a wide range of colors and to produce colored fabrics, materials or photographs utilizing such intermediates. Still further objects will appear hereinafter.

The above objects are acomplished by the hereinafter described invention which in its broader aspects involves the preparation and use in photographic color processes and compositions therefor of substituted naphthalene dye intermediates having a hydroxyl group on one ring and on the other a basic nitrogen atom which is connected by means of a methylene type carbon atom to an organic radical containing an amide nitrogen atom.

In a more limited aspect, the invention involves the preparation and use of dye intermediates of the following general formula:

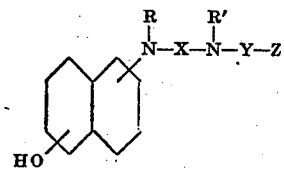

wherein R is hydrogen or an alkyl radical of 1 to 4 carbon atoms, R' is hydrogen or a hydrocarbon radical, X is any organic bivalent connecting group or bridging radical joined to the naphthylamine nitrogen atom through a methylene type of carbon atom, Y is either CO or $SO_2$, and YZ is the residue of any organic acid, i. e. the non- hydroxyl residue of an aliphatic, aryl, mixed aliphatic aryl, or heterocyclic acid, or it may represent one unit of a poly-sulfonic, -carboxylic or polymeric acid. Of course, the naphthalene nucleus may have other substituents as are well known in the dye chemistry art to modify the characteristics of the dyes formed; thus it may contain halogen, alkyl, aryl, acyl, alkoxy, cyano, nitro, carboxylic, sulfonic, sulfone, etc. groups depending on what specific properties are desired.

The importance of the basicity of the naphthylamine nitrogen atom in the novel dye intermediates heretof is illustrated by the behavior of 1-amino-5-naphthol which can couple to form two types of azo dyes.

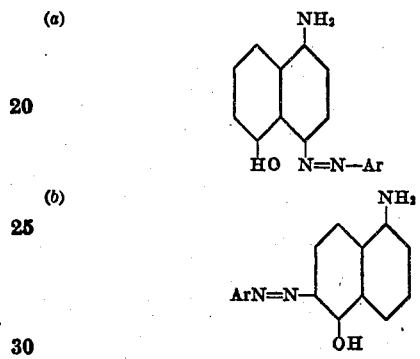

Type $a$ is the most desirable, giving much deeper and brighter shades than Type $b$ but is only formed by coupling in acid solutions where the nitrogen atom is basic, that is, when it will form a salt with dilute mineral acid. In general the more basic this nitrogen atom, the better the azo dyes. To insure a basic nitrogen atom it is necessary to have this nitrogen atom joined to a methylene type carbon atom, since if the nitrogen atom is joined to an aromatic carbon atom its basicity is markedly decreased and a second and undesirable coupling function is introduced. Similarly if it is joined to an acyl group, the basicity is destroyed and the directive action of this amine group in the naphthalene ring is lost.

One important feature is the use of selected members of the dye intermediates of this invention as immobile dye intermediates in processes of color photography. By immobile dye intermediates we mean colloids which form clear, neutral or mildly alkaline, aqueous dispersions or solutions and which will remain firmly bound in the colloid layers of photographic elements without migration therein or into adjacent layers thereof during processing steps involving development, bleaching, oxidizing, fixing, washing, etc. These colloids being soluble in aqueous solutions are compatible with gelatin solutions, and on processing give rise to brighter and clearer colors than it is possible to obtain using the less soluble type of dye intermediate that must be dispersed mechanically in the gelatin layer. It has been found that a practical way to obtain these properties is to increase the molecular weight and introduce acidic salt-forming groups, thus keeping the compound soluble in aqueous systems but at the same time making them of such high molecular weight that they cannot move about in the colloidal binding layers of the photographic element.

A satisfactory method for preparing such immobile dye intermediates is by condensing an amine-containing dye intermediate with a carboxylic acid or derivative thereof or with an organic sulfonyl chloride to form an amide. This reaction can be used advantageously on compounds containing an amine group in a side chain substituent of the hydroxy naphthylamine nitrogen atom in which case compounds of our invention are produced. These compounds retain the advantageous dye-forming properties of the aminonaphthols even after being converted to immobile products.

It has been found that immobile compounds are obtained in general when the acid used in preparing the amide is a straight or branched chain aliphatic, cycloaliphatic, aromatic, or heterocyclic carboxylic or sulfonic acid of six or more carbon atoms. These acids are not limited to monobasic acids but may contain a plurality of acid groups, i. e., may be polycarboxylic, polysulfonic, or polymeric acids. The desired solubility of these products in aqueous solutions is obtained by the presence of sulfonic and carboxylic acid groups which are either in the reactants before preparation of the final products or are introduced at some suitable stage.

Compounds of the preceding type when dispersed in photographic emulsions are useful in various processes of color photography. For example, a quinoneimine type of dye image may be produced by chromogenic development of reducible silver salt images with color developing agents such as paraphenylenediamine and its monoalkyl or unsymmetrical dialkyl derivatives. In general the colors produced in this manner are blue to blue-green depending on the substituents in the particular compound and on the developing agent used. For instance, the introduction of halogen or a sulfonamide group into the naphthol nucleus has been found to have a bathochromic effect on the dyes, producing a greener color.

Furthermore, compounds of this immobile class when contained in photographic film elements having light sensitive silver salts are useful in converting color developed images to colorless bodies and in producing azo dyes as described in Woodward U. S. Serial No. 355,416, filed May 15, 1940. Compounds especially suitable in this respect contain in the ring having the hydroxyl group, a group having a negative polarizing effect. Thus, when such a substituent, e. g., a sulfonic, carboxyl, halogen, nitro, sulfonamide, cyano group or the like is present in the ring containing the naphtholic hydroxyl group, the dyes formed on color development are less stable to the decolorizing procedures described in the above mentioned application and are more easily converted to completely colorless bodies than when the naphtholic ring contains no substituents or contains a positive polarizing group.

The dyes produced from immobile 1-amino-5-naphthol derivatives of this invention are of great importance in processes of multicolor photography because they provide one of the few methods for obtain minus red (i. e. blue-green) mono-azo dyes when the proper diazonium compounds are used. For other uses, such as in making azo dyes for textile dyeing, paints, ink manufacture, rubber coloring, etc., it is obvious that different types of structure are preferred. Thus, for example, in making dyes for cellulose acetate, the product should be devoid of acidic groups, while in other cases they should contain one or more sulfonic acid groups to make them substantive to cotton or wool or convertible to water-insoluble pigments, etc.

The products of the invention can be prepared in a variety of specific ways which involve a condensation of an aminonaphthol or a polyhydric naphthol with a compound containing the remaining nuclei necessary to form a part or all of the compound having the structure set forth in the above general formulae. Molecules such as water, hydrogen halide or ammonia are generally split off in the condensations. The group —Y—Z is preferably introduced after the condensation with the naphthol nucleus has been completed. In general, it is accomplished by acylation, including sulfonylation of an amino group in the radical attached to the naphthylamine nitrogen atom.

The immobile intermediates of this invention can be added to organic colloidal dispersions in various ways. A practical manner involves dissolving the purified intermediates in aqueous or slightly alkaline solution, usually with the addition of a small amount of a water-soluble organic solvent, and admixing it with the organic film-forming colloid which may be a photographic emulsion. The combined colloids are then cast on a suitably subbed film base or on an organic colloid layer or water permeable membrane to form, for example, single or multilayer elements for color photography.

The following procedures are illustrative of the general methods just described.

1. An aminonaphthol containing a hydroxyl group in one ring and an amino group in the other is condensed in an anhydrous solvent with an alkyl halide containing an amide group, for example, beta-acetaminoethyl bromide. If it is desired to obtain a final product having a different radical on the amide nitrogen, the material may be hydrolyzed in boiling dilute mineral acid and acylated or sulfonylated with an agent such as an acid or derivative thereof including carboxylic acid esters, e. g. the ethyl and methyl esters, acyl halides, acid anhydrides, etc., abietic acid, methyl naphthoate, stearoyl chloride, or ethylene-maleic anhydride polymer, sulfonyl chlorides such as benzenesulfonyl chloride, dodecylsulfonyl chloride, p-dodecylbenzenesulfonyl chloride, or polymeric sulfonyl chlorides as described in U. S. Patent 2,212,786, etc., are representative type compounds.

2. In place of the acetaminoalkyl halide it is possible to use a nitroalkyl halide, e. g. p-nitrobenzylchloride, p - nitrophenoxyethyl bromide. The product obtained which contains a nitro group can be converted into an amino compound by reduction and further treated. For instance, the nitro group can be reduced with zinc and hydrochloric acid, iron or any other suitable method and the resulting amine converted to an amide with a suitable organic acid or acid halide or derivative thereof, such as a methyl or ethyl ester of a carboxylic acid or sulfonyl chloride as described in procedure 1.

3. Another method consists in condensing a nitroaldehyde such as m-nitrobenzaldehyde with an aminonaphthol to form a Schiff's base. The nitro group thereof as well as the unsaturated bond can be reduced either chemically or catalytically to form an m-aminobenzylaminonaphthol, and the amino group thus formed can be converted to an amide after the manner set forth in procedures 1 and 2.

4. When the amino group of the aminonaphthol is in the beta position and the hydroxyl group in the alpha position, it is possible to condense the compound with a diamine and the amino group which is not attached to the aromatic nuclei can be converted to an amide group as set forth in procedures 1 and 2. For instance, ethylenediamine, in an aqueous sodium bisulfite solution condenses with α-hydroxy-β-naphthylamine to form the beta-aminoethyl derivative which may then be converted to an amide group.

5. Dihydroxynaphthalene may be condensed with an alkylamine containing an acetamino group, e. g., monoacetylethylenediamine. The acetaminoalkylaminonaphthol is obtained and this may be hydrolyzed and acylated or sulfonylated with any other suitable organic acid or derivative thereof as in procedures 1 and 2.

The invention can be better understood by a consideration of the following examples in which all parts are by weight, but is not intended to be limited thereby.

Example I

In a closed reaction vessel equipped with a return condenser, heater, and a slow flow of purified nitrogen gas is placed 16 parts of 1-amino-5-naphthol and 100 parts of anhydrous boiling dioxan. When solution is complete and the mixture is boiling gently, 28 parts of p-(beta-bromoethoxy)acetanilide is introduced through the condenser. The flow of nitrogen gas is maintained and boiling continued for 24 hours, at which time the mixture is poured with agitation into 400 parts of ice water containing 9 parts of sodium hydroxide. The mixture is extracted with 3 portions of 100 parts each of benzene and the aqueous layer cooled to 5° C. and neutralized with 13 parts of concentrated hydrochloric acid of specific gravity 1.19. The solid precipitate is removed and dissolved in 100 parts of 80° ethyl alcohol, neutralized to litmus paper with sodium acetate, boiled with activated charcoal, filtered and cooled. White crystals melting at 209–211° C. separate in 60% yields. Anal. calc. for $C_{20}H_{20}O_3N_2$; N, 8.34. Found: N, 8.44. The product, 1-p-acetaminophenoxyethylamino-5-naphthol, has the following formula:

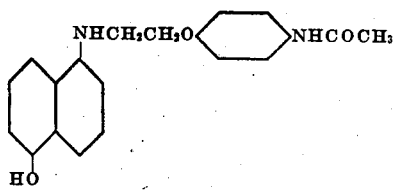

This material, when suspended in water containing 3% acetic acid and treated with an aqueous solution containing an aquimolar amount of 2,4-dinitrobenzene diazonium chloride at 10° C. forms a blue-green azo dye having a spectral transmission maximum at 490 millimicrons and a spectral absorption maximum at 600 millimicrons. It is useful as a dye intermediate in colloid layers of photographic elements for color forming development with aromatic diamino and arylhydrazine developing agents and azo coupling processes of color photography.

Example II

To 600 parts of boiling water containing 40 parts of concentrated hydrochloric acid of specific gravity 1.19 in an open reaction vessel is added 34 parts of the product of Example I. Boiling is continued for four hours, water being added to maintain the original volume. Then 1 part of sodium sulfite and 5 parts of activated charcoal are added and the mixture filtered. To the filtrate is added 50 parts of concentrated hydrochloric acid and the mixture cooled to 0°. The solid hydrochloric acid salt which separates is removed, dissolved in 200 parts of boiling water, and the solution neutralized with 25 parts of sodium acetate. The mixture, upon cooling to room temperature and filtration, yields a light tan colored product. This material, when recrystallized from 95% alcohol, yields 26 parts of white crystals melting at 161–164° C. Anal. calcd. for $C_{18}H_{18}O_2N_2$; N=9.5. Found: N=9.3. The product, 1-p-aminophenoxyethylamino-5-naphthol, has the following structure:

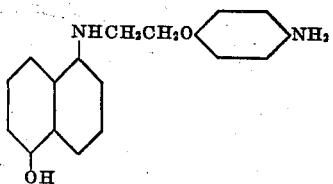

In a closed reaction vessel equipped with a heater, return condenser, and a slow flow of purified nitrogen gas is placed 150 parts of the above compound and 600 parts of dry acetone. The mixture is heated and, when the solution is boiling gently, 63 parts of an ethylene-maleic anhydride interpolymer in 400 parts of acetone is added through the condenser. After the mixture has boiled for 6 hours, it is poured into 5000 parts of benzene with agitation, filtered, and extracted with benzene in a continuous extractor for 12 hours. The material after drying and grinding yields 180 parts of a light gray powder readily soluble in 5% sodium carbonate solution. Analysis: N=5.85%, which corresponded to a reaction of 90% of the anhydride groups with amine groups. This compound has the following probable dye intermediate unit structure:

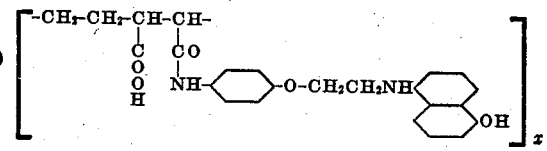

When 10 parts of this compound is dissolved in 100 parts of 4% aqueous sodium carbonate solution and mixed with 900 parts of a gelatino silver halide photographic emulsion containing 10 to 12% solids and are coated on a suitably subbed support, a film is obtained from which the intermediate is not removed by prolonged washing in alkaline or acidic aqueous solutions. A sample of this film can be exposed by controlled light, developed in a 4-aminodiethylaniline developer, and bleached and fixed by the customary procedure to yield a blue-green indoaniline dye image. Films prepared in this way can be treated with aqueous diazonium solutions of pH 1–7, with fixing prior or subsequent to such treatment, to yield clear, brilliant azo dyes. A partial list of the colors which may be formed is contained in the following table:

| Diazotized amine | Color |
| --- | --- |
| Aniline | Bluish red. |
| 2,4-dichloroaniline | Magenta. |
| Dianisidine | Red-blue. |
| p-Nitroaniline-o-sulfonic acid | Blue. |
| 2-chloro-4-nitroaniline | Do. |
| 2,4-dinitroaniline | Blue-green. |

*Example III*

In a closed reaction vessel with a heater and return condenser are placed 261 parts of the sodium salt of 1-amino-5-naphthol-7-sulfonic acid and 900 parts of water. The mixture is heated until solution is complete, then 136 parts of sodium acetate and 900 parts of dioxan are added and the mixture heated to its boiling point. To this solution is added 130 parts of p-nitrophenoxyethyl bromide of the following formula:

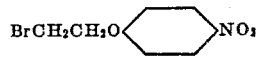

and boiling continued for 12 hours. During this time and subsequent boiling, 20% sodium hydroxide solution is added in small portions to keep the mixture neutral to litmus paper. Next an addition of 40 g. of the above nitro compound is made and boiling continued for 12 hours, and the procedure repeated until a total of 250 g. of the nitro compound has been added. The mixture is then poured with agitation into 3000 parts of ice water containing 200 parts of concentrated hydrochloric acid of specific gravity 1.19. The solid is removed by filtration and stirred in 3000 parts of boiling acetone, then filtered and dried. The product is next dissolved in 2000 parts of boiling water containing 50 parts of sodium hydroxide, filtered hot, cooled, and acidified with 150 parts of concentrated hydrochloric acid. The product is removed by filtration and dried to give 215 parts of a light gray powder. Analysis, calcd. for $C_{18}H_{16}O_7N_2S$: N=6.94. Found N=7.18. The compound, N-p-nitrophenoxyethyl-M-acid, has the following formula:

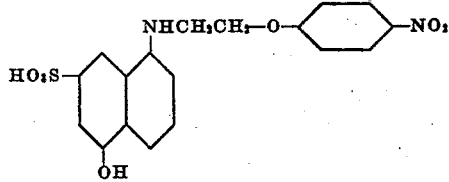

The nitro group in this compound is reduced to an amino group with iron in aqueous solution. Twelve parts of the nitro compound is dissolved in 200 parts of water with sufficient 20% sodium hydroxide solution to make a neutral solution. Two parts of acetic acid is added, followed by 8 parts of iron filings. The mixture is stirred and boiled for one hour, made alkaline with 5 parts of sodium carbonate, and filtered. The filtrate is cooled to room temperature and acidified to a full spot on Congo red paper with concentrated hydrochloric acid, filtered and dried to give 11 parts of a light gray powder.

In a reactor with three openings fitted with a sealed agitator, an L-shaped distillation column with a downward collecting condenser, and additional cock is placed 2500 parts of dimethyl formamide, 300 parts of the above amino compound, and 32 parts of sodium hydroxide dissolved in 32 parts of water. The mixture is agitated and heated until distillation occurs, then a slow rate of distillation is maintained until the temperature at the column head reaches 147–150° C. At this point 160 parts of a styrene-maleic anhydride polymer dissolved in 800 parts of dimethyl formamide is added during the next half hour with agitation and distillation maintained at a slow rate. After addition is complete, distillation is maintained until a total of 1400 parts has collected in the receiver. Heating is continued for a total of six hours; then the mixture is cooled to room temperature and poured into 2500 parts of ice water and sufficient 20% sodium hydroxide added to make the solution just alkaline to Brilliant Yellow test paper. The solution is dialyzed for four days in a parchment paper container placed in running water. The resulting solution is filtered and evaporated to dryness under reduced pressure. In this way 280 g. of a light brown solid is obtained. The material has properties similar to those of the polymeric product of Example II and can be used similarly.

*Example IV*

To a mixture of 300 parts of concentrated sulfuric acid of specific gravity 1.84 and 50 parts of 20% oleum is added 37 parts of the 1-p-aminophenoxyethylamino-5-naphthol of Example II. The solution is warmed to 80° C. for ½ hour, then cooled and stirred into 800 parts of ice and filtered. The crude product is dissolved in 200 parts of water by adding sodium carbonate until the solution becomes neutral or slightly alkaline. It is then filtered and the product precipitated by the addition of 25 parts of concentrated hydrochloric acid of specific gravity 1.19. Upon filtration and drying 34 parts of a white solid of the following probable structure is obtained.

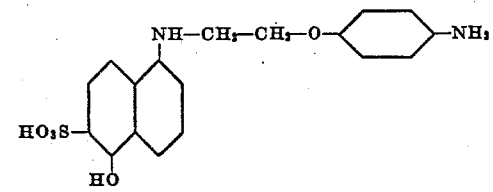

This material 1-N-p-aminophenoxyethylamino-5-naphthol-6 (or 8) sulfonic acid is isomeric with the diamine of Example III and can be used in the same reactions to give a product having similar properties. Analysis calculated for $C_{18}H_{18}O_5N_2S$: S=8.35. Found: S=8.48; 8.34.

*Example V*

To a boiling solution of 160 parts of 1,5-aminonaphthol and 300 parts of absolute alcohol is added 151 parts of m-nitrobenzaldehyde and the solution cooled slowly with agitation to 0° C. The solid is removed and dried to give 270 g. of the bright yellow crystalline Schiff's base melting at 191–193° C. Analysis, calcd. for $C_{17}H_{12}O_3N_2$: N=9.59. Found N=9.51.

A 31-part sample of the above Schiff's base is dissolved in 150 parts of dioxan and reduced in the presence of nickel catalyst with hydrogen at 2000 pounds pressure. The solution of 1-m-aminobenzylamino-5-naphthol is freed of catalyst by filtration, dried with anhydrous magnesium sulfate, and condensed with 15 parts of an ethylene-maleic anhydride polymer, as is the amino compound in Example II. In this way 38 parts of a light gray polymeric product is obtained which has properties similar to those of the product of Example II and similar utility.

*Example VI*

To a reaction vessel having three openings and equipped with an addition cock, a sealed agitator and a return condenser is added 250 parts of 2-amino-5-naphthol-7-sulfonic acid, 800 parts of water, and 130 parts of ethylene diamine. The mixture is heated to its boiling point and stirred while 2500 parts of hot 40% sodium bisulfite solution is added during one-half hour. Stirring and boiling are continued for five hours (after about one hour crystals separate), then cooled and filtered. The solid is dissolved in 1000 parts of hot water containing 40 parts of sodium hydroxide, filtered, and poured slowly with agitation into 2000 parts of boiling water containing 200 parts of concentrated hydrochloric acid. On cooling, filtering, and drying, white crystals are obtained in 95% yield. Analysis indicates that this compound has the following structure:

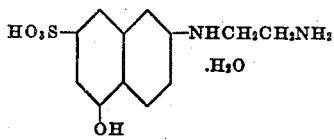

This material is readily condensed with a styrene-maleic anhydride polymer in the ratio of 63 parts of the amine to 40 parts of the polymer by the method described in Example III. The resulting product, obtained in 25% yield, is light brown in color, and analysis indicates that 70% of the anhydride groups have reacted with amino groups. The dye intermediate unit has the following probable structure:

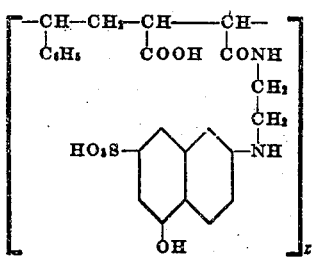

The above material can be incorporated in a gelatin layer similar to the compound in Example II. A partial list of the colors obtained by treating such films with diazotized amines in solutions of pH 1–6 is as follows:

| Diazotizable amine | Color |
| --- | --- |
| Sulfanilic acid | Orange-red. |
| 1-naphthylamine-7-sulfonic acid | Scarlet. |
| p-Nitroaniline-o-sulfonic acid | Magenta. |
| 2-chloro-4-nitroaniline | Do. |
| Dianisidine | Purple. |
| 2,4-dinitroaniline | Blue. |

*Examples VII*

A solution of 28 parts of N-beta-aminoethyl-J-acid of Example VI and 4 parts of sodium hydroxide in 250 parts of water is stirred at 15–20° C. while 32 parts of octadecylsulfonyl chloride is added during 2 hours. During this time sodium carbonate is added to maintain a neutral solution. The mixture is cooled to 0° after stirring an additional 2 hours and filtered. The product is stirred in 400 parts of boiling water, filtered, made acid to Congo red paper, cooled, separated from the water by centrifugal force, and dried to give a light gray product readily soluble in warm 2% sodium carbonate solution. It has uses similar to those of compound of Example VI and gives similar colors.

*Example VIII*

In a reaction vessel containing a sealed agitator, a short fractionating column, and an addition cock is placed 80 parts of 1,5-dihydroxynaphthalene and 300 parts of decahydronaphthalene. The mixture is stirred and boiled gently while 80 parts of monoacetyl hexamethylenediamine to which has been added 25 grams of sulfur dioxide is added during two hours. During this time the temperature is maintained high enough so that the water-solvent mixture distills continuously until 7 parts of water have been collected. Steam is then passed through the mixture to remove the solvent. To the aqueous residue of about 500 parts volume is added 100 parts of concentrated hydrochloric acid and the mixture boiled for one hour, then cooled to room temperature and extracted with ether. The aqueous portion is heated to expel the ether and activated charcoal added. After heating a short time the solution is filtered at the boiling point and cooled to room temperature. After neutralizing with sodium carbonate and cooling, 60 parts of 1-omega-aminohexylamino-5-naphthol is obtained by filtration. This compound has the following formula:

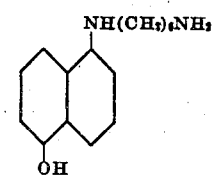

and may be acylated with any acid derivative, for example, as the compound in Example II or Example V. One part of such a derivative prepared by condensation with an ethylene-maleic anhydride polymer dissolved in 10 parts of 2% sodium carbonate solution is added to 100 parts of a photographic gelatino-silver halide emulsion containing 12–15 parts solids. This mixture is coated on a cellulose acetate film base, dried, exposed in a camera, developed in a p-aminodiethylaniline developer, and the silver and silver salts removed, leaving an image in a blue-green indoaniline dye.

*Example IX*

In place of the monoacetyl hexamethylenediamine of Example VIII is used 90 parts of monoacetyl piperazine in the same reaction. The product is isolated and hydrolyzed by the same method and is 5-hydroxynaphthyl-1-piperazine of the following probable formula:

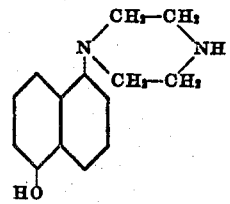

This compound can be used in place of the diamine of Example II or can be sulfonated by the method given in Example IV and used in place of the intermediate of that example.

The number of naphthols that may be used in preparing compounds of this invention is very large, and suitable compounds may be found in any of the textbooks on azo dye chemistry; for instance, Fierze-David, "Künstliche Organische Farbstoff," pp. 87–205. The choice of the particular compound to be used will depend to a large extent on the properties desired in the final dye intermediate. Thus, derivatives of 1,5- and 1,8-aminonaphthol are particularly suited for producing blue and blue-green azo dyes, while derivatives of 2,5- and 2,8-aminonaphthol are desirable for producing red and magenta dyes.

In all of the products of this invention, coupling positions must be available, that is, they must contain either hydrogen or a replaceable group such as halogen, sulfonic, or carboxylic acid, which act like hydrogen in the coupling reaction. Thus, if the naphthylamine nitrogen atom or the naphthol hydroxyl is in an alpha position, an ortho or para position must be available, while if either of these groups occupy a beta position, an ortho alpha position must be available for coupling.

Many other groups than those previously mentioned may be substituted on the naphthylamine nitrogen as long as the group contains an amide nitrogen atom and is connected to the naphthylamine nitrogen atom through a methylene type carbon so that there will be only one basic aryl amine nucleus in which coupling may occur. These groups, in addition to the amide nitrogen, may contain other substituents such as halogen, hxydroxyl, alkoxy, ether linkages, cyano, carboxylic acid, sulfonic acid, sulfone, sulfide, and nitro. A partial list of the types of groups that may be used is as follows:

$x=1$ to 20.

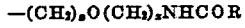

$x=1$ to 10.

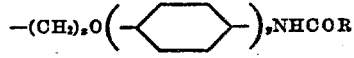

$x=1$ to 10; $y=1$ to 3.

$x=1$ to 10; $y=1$ to 3.

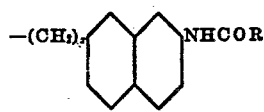

$x=1$ to 10.

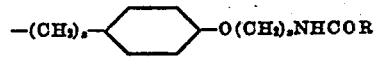

$x=1$ to 10.

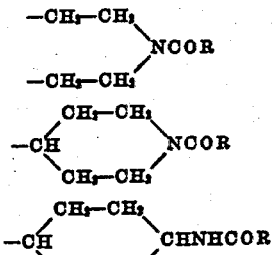

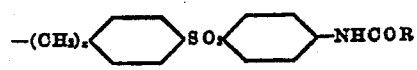

$x=1$ to 10.

In all of these groups any of the hydrogen atoms connected to carbon may be replaced by small alkyl groups, e. g. methyl ethyl, etc. or the —CO— group replaced by —SO₂—. The radical R in the formulae may be residue of any mono-, di- or poly-carboxylic acid, or may be of a unit of a polymer. Thus, R may be (1) residue of an aromatic or substituted or unsubstituted aliphatic, straight, branched chain, or a cycloaliphatic saturated or unsaturated carboxylic acid. Thus, RCO may be the acyl radicals from acids such as oleic, hydroxy-stearic, ricinoleic, stearolic, campholic, phenyl-acetic, cholic, furoic, glycocholic, benzoic, naphthoic, abietic, naphthenic, straight chain saturated acids, e. g. $CH_3(CH_2)_xCOOH$, wherein $x=0$ to 30 or (2) the residue of a polymeric acid such as a polypeptide or polyamide of the type set forth in U. S. application, Serial No. 301,041, or (3) a unit of a polycarboxylic acid in which one or more carboxylic acid groups are similarly substituted, such as camphoric, phthalic, naphthalic, —(CH₂)ₓ—, where $x=1$ to 20, mellophanic, tricarballylic, polyacrylic, polymethacrylic, polyolefinmaleic, or (4) a unit of a polysulfonic acid prepared from the polysulfonyl chlorides of U. S. Patent 2,212,786. The choice of the group to be used depends on the properties desired in the final product. Thus, for making immobile photographic dye intermediates the R will be in general chosen so that it contains more than 8 carbon atoms or is a unit of a polymeric chain, while if it is desired to produce dyes for coloring textiles, paints, inks, rubber, etc., other groups will be used which, as is well known in the art, produce properties valuable for the particular use desired.

In place of the specific developing agents described in the above examples can be substituted a large number of other color-developing agents containing an unsubstituted amino group. Suitable additional agents are described in U. S. Patents 2,182,815, 2,189,817, 2,191,037 and 2,200,924.

The silver salt images can also be developed with hydrazine developers in like manner to produce azo dye images. Suitable developers are described in U. S. Patent 2,200,929.

In addition, a silver halide emulsion layer containing one of the herein described dye intermediates which has been exposed and developed to a silver image and fixed can be treated with a diazo or tetrazo, etc. salt and converted into a colored image by the process of U. S. Patent 1,517,049.

The dye intermediates are useful in various types of color processes wherein dye images are produced by color coupling development and azo coupling processes in the known manners. They may be used in conjunction with various types of reducible silver salt images including those from simple and mixed silver halides, such as silver chloride, silver bromide, silver chlorobromide, silver chloride bromide iodide, etc. images; latent images, bleached silver images, such as silver ferrocyanide, silver-copper-chloride, silver-chromium-chloride, as well as silver chromate, and other water insoluble silver salts. Images produced by the exposure of bichromated gelatin are also reduced by the color-forming development procedures described above.

The novel dye intermediates can be used with hydrazine developers in a similar manner to produce dye images. Suitable developers and procedures are set forth in U. S. Patent 2,220,929.

Various types of organic colloids can be used as binding agents for the dispersions or emulsions and colloid layers and materials described herein. Suitable colloids exhibiting high viscosity characteristics and appreciable jelly strength, which are compatible with the novel dye intermediates hereof in place of gelatin, include albumin, agar-agar, Irish moss, synthetic resins, e. g. polyvinyl acetals, etc.

The dye intermediates need not be placed directly in light sensitive layers, but may be used in separate layers which are in operative association therewith. Thus, they can be incorporated in a separate gelatin or other water permeable colloid layer which is superimposed on the light sensitive layers or spaced therefrom by means of thin water-permeable colloid layers.

The products of this invention are useful in preparing azo dyes for many different applications. By varying the type of substituent of these aminonaphthols, it is possible to introduce groups which give the intermediates and dyes produced from them valuable properties. Formerly, it was possible to produce compounds containing these groups only by direct acylation of the naphthylamine nitrogen, which destroyed its value as a directive coupling group and made it impossible to produce many of the desired shades.

The compounds which contain as a substituent on the amide group a residue as before described to render the product immobile in photographic films are of use in producing colored pictures by the method described by U. S. Patents 1,055,155, 2,178,882, 2,179,228, 2,179,238, 2,179,239, and in the process of Woodward U. S. application Serial No. 335,416.

As many apparently widely different embodiments of this invention may be made without departing from the spirit and scope thereof, it is to be understood that the invention is not to be limited except as defined in the appended claims.

We claim:

1. A substituted aminonaphthol having a hydroxyl group directly attached to one benzene ring and directly attached to the other benzene ring an amino group which is linked through a —CH₂— group to a bivalent radical taken from the group consisting of bivalent hydrocarbon radicals and ether interrupted hydrocarbon radicals which bivalent radical is in turn linked to the amido nitrogen of an amide.

2. A substituted naphthalene dye intermediate having the general formula:

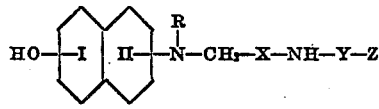

wherein the hydroxyl group is substituted on benzene nucleus I, the —NR— group is attached to benzene nucleus II, R is a member of the group consisting of hydrogen and alkyl radicals of 1 to 4 carbon atoms, X is a bivalent radical taken from the group consisting of bivalent hydrocarbon radicals and ether interrupted hydrocarbon radicals, Y is a member of the group consisting of —CO— and —SO₂— and —Y—Z is the radical of an organic acid taken from the group consisting of organic carboxylic and sulfonic acids from which the acid hydroxyl group has been removed.

3. A dye intermediate as set forth in claim 2 wherein benzene nucleus I contains a solubilizing group taken from the group consisting of carboxylate and sulfonate groups.

4. A polymeric compound having recurring structural units of the general formula:

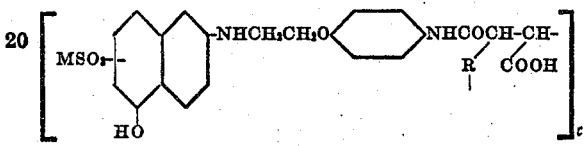

wherein M is a member of the group consisting of hydrogen and water-soluble salt forming groups and R is a hydrocarbon radical and $x$ is an integer.

5. A substituted aminonaphthol having a hydroxyl group directly attached to one benzene ring and directly attached to the other benzene ring an amino group which is linked through a —CH₂— group to a bivalent radical taken from the group consisting of bivalent hydrocarbon radicals and ether interrupted hydrocarbon radicals which bivalent radical is in turn linked to the amido nitrogen of an amide having at least 6 carbon atoms.

6. A substituted naphthalene dye intermediate having the general formula:

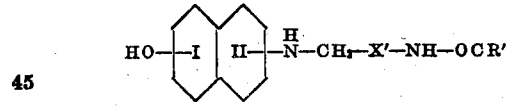

wherein the hydroxyl group is substituted on benzene nucleus I, the —NH— group is attached to benzene nucleus II, X' is a bivalent hydrocarbon radical of 1 to 20 carbon atoms and R'CO is an acyl radical.

JAMES EMORY KIRBY.
DAVID W. WOODWARD.

CERTIFICATE OF CORRECTION.

Patent No. 2,365,345.

December 19, 1944.

JAMES EMORY KIRBY, ET AL.

It is hereby certified that error appears in the printed specification of the above numbered patent requiring correction as follows: Page 1, first column, line 28, for "acomplished" read --accomplished--; and second column, line 13, for "heretof" read --hereof--; page 6, second column, line 47, for the patent number "2,200,929" read --2,220,929--; page 7, second column, line 24, in the formula, for the letter "c" outside of the right-hand bracket read --x--; and that the said Letters Patent should be read with this correction therein that the same may conform to the record of the case in the Patent Office.

Signed and sealed this 27th day of March, A. D. 1945.

Leslie Frazer (Seal)

Acting Commissioner of Patents.